(12) United States Patent
Beebe

(10) Patent No.: US 10,723,261 B2
(45) Date of Patent: Jul. 28, 2020

(54) AUTOMOBILE INDICIA LAMP FOR ACKNOWLEDGING DRIVERS OF COMMON VEHICLES

(71) Applicant: Gary Beebe, Flint, MI (US)

(72) Inventor: Gary Beebe, Flint, MI (US)

( * ) Notice: Subject to any disclaimer, the term of this patent is extended or adjusted under 35 U.S.C. 154(b) by 0 days.

(21) Appl. No.: 16/296,589

(22) Filed: Mar. 8, 2019

(65) Prior Publication Data

US 2019/0275927 A1  Sep. 12, 2019

Related U.S. Application Data

(60) Provisional application No. 62/640,224, filed on Mar. 8, 2018.

(51) Int. Cl.
*B60Q 1/50* (2006.01)
*G08G 1/015* (2006.01)
*G06K 9/00* (2006.01)

(52) U.S. Cl.
CPC ........... *B60Q 1/50* (2013.01); *G06K 9/00825* (2013.01); *G08G 1/015* (2013.01)

(58) Field of Classification Search
None
See application file for complete search history.

(56) References Cited

U.S. PATENT DOCUMENTS

| 3,665,392 | A | 5/1972 | Annas | |
|---|---|---|---|---|
| 5,124,845 | A | 6/1992 | Shimojo | |
| 5,394,138 | A * | 2/1995 | Stephens | B60Q 1/52 340/463 |
| 5,566,384 | A | 10/1996 | Chien | |
| 7,065,909 | B2 * | 6/2006 | Snyder | G09F 21/02 40/542 |
| 7,659,808 | B1 | 2/2010 | Cooper et al. | |
| 9,959,768 | B2 * | 5/2018 | Leppanen | B60Q 1/50 |
| 2015/0336502 | A1 * | 11/2015 | Hillis | B60Q 1/26 701/23 |
| 2017/0024769 | A1 * | 1/2017 | Sarangi | G06Q 30/0266 |

* cited by examiner

*Primary Examiner* — Adolf Dsouza
(74) *Attorney, Agent, or Firm* — Young Basile Hanlon & MacFarlane, P.C.

(57) ABSTRACT

Methods and apparatuses for selectively acknowledging drivers of other motor vehicles. One implementation is a method and apparatus that comprises detecting a share and desired characteristic between a first motor vehicle and a second motor vehicle by illuminating an indicator on the first motor vehicle to acknowledge a driver of the second motor vehicle in response to the second motor vehicle sharing the desired characteristic with the first motor vehicle.

18 Claims, 5 Drawing Sheets

AUTOMOBILE INDICIA LAMP FOR ACKNOWLEDGING DRIVERS OF COMMON VEHICLES

CROSS-REFERENCE TO RELATED APPLICATION

This application claims the benefit of U.S. Provisional Patent Application Ser. No. 62/640,224, filed on Mar. 8, 2018, which is incorporated in its entirety by reference.

TECHNICAL FIELD

This disclosure relates to motor vehicle lamps and, in particular, to motor vehicle indicia lamps for selectively acknowledging drivers of other motor vehicles.

BACKGROUND

For some motor vehicle brands, drivers feel a sense of community and may acknowledge one another as they pass on a roadway. The acknowledgment may be intended only for drivers of the same motor vehicle brand. For example, drivers of a certain motor vehicle brand may acknowledge drivers of the same motor vehicle brand but will not acknowledge drivers of other motor vehicle brands. Such acknowledgments may be performed manually by the driver, such as a simple wave of the hand or flashing the peace sign by raising the driver's index and middle fingers after visually identifying the motor vehicle brand. However, identifying an oncoming motor vehicle as a particular brand and then acknowledging the driver of that motor vehicle in time so that the driver has time to provide the acknowledgement can be a distraction when operating a motor vehicle. Therefore, it is desirable to provide a method and apparatus that can identify an oncoming motor vehicle as a particular brand and acknowledge the driver of that particular motor vehicle without creating a distraction to the driver.

SUMMARY

The disclosure provides for methods and apparatuses for automatically and selectively acknowledging drivers of other motor vehicles. The method includes detecting a shared and desired characteristic between a first motor vehicle and a nearby second motor vehicle and illuminating an indicator on the first motor vehicle to acknowledge a driver of the nearby second motor vehicle in response to a determination that the nearby second motor vehicle shares the desired characteristic with the first motor vehicle. The method further includes ceasing illumination of the indicator once the nearby second motor vehicle has passed the first motor vehicle. The indicator may be disposed on a side mirror of the first motor vehicle or within the first motor vehicle and is visible to the driver of the nearby second motor vehicle. The signal sent by the nearby second motor vehicle and received by the first motor vehicle indicates that the second vehicle shares the same desired characteristic with the first motor vehicle. The method may further include discontinuing a current illumination state of the indicator in response to a determination that the nearby second motor vehicle does not share the desired characteristic with the first motor vehicle, wherein the desired characteristic is a common motor vehicle brand. The indicator may comprise an outline of a design which may include a hand giving a peace sign.

Another implementation is an apparatus that allows a driver of a first motor vehicle to selectively acknowledge a driver of a second motor vehicle by having a light source connectable to a power source and carried by the first motor vehicle, wherein the light source is configured to illuminate an indicator to the driver of the nearby second motor vehicle when selectively powered by the power source. At least one relay is disposed within the first motor vehicle and configured to receive signals from the second motor vehicle, wherein the at least one relay allows power to be delivered to the light source upon receiving a desired wireless signal from the second motor vehicle. A housing may be connected to the first motor vehicle and configured to house the power source, the light source, and the at least one relay, wherein the power source may comprise a solar panel. The indicator comprises apertures extending through a front portion of the housing so that light from the light source is emitted through the apertures to illuminate the indicator, wherein the housing is attachable to a side mirror of the first motor vehicle. The indicator may comprise a design which may include an outline of a hand giving a peace sign. The desired wireless signal may indicate that the first motor vehicle and the second motor vehicle share a common manufacturer or brand. The at least one relay is configured to use at least one of a radio frequency, Bluetooth, Zigbee, GPS, or Wi-Fi signal, wherein the at least one relay is configured to stop powering the indicator once the second motor vehicle is out of range of the first motor vehicle.

In another implementation, a lamp portion may have a substantially disc-like configuration with the light source extending along an outer periphery of the lamp portion and may be mountable within the first motor vehicle. A trigger is configured to allow the driver of the first motor vehicle to override the at least one relay and selectively power the power source. The indicator may also comprise an outline of a design which may include a hand giving a peace sign or some other image.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
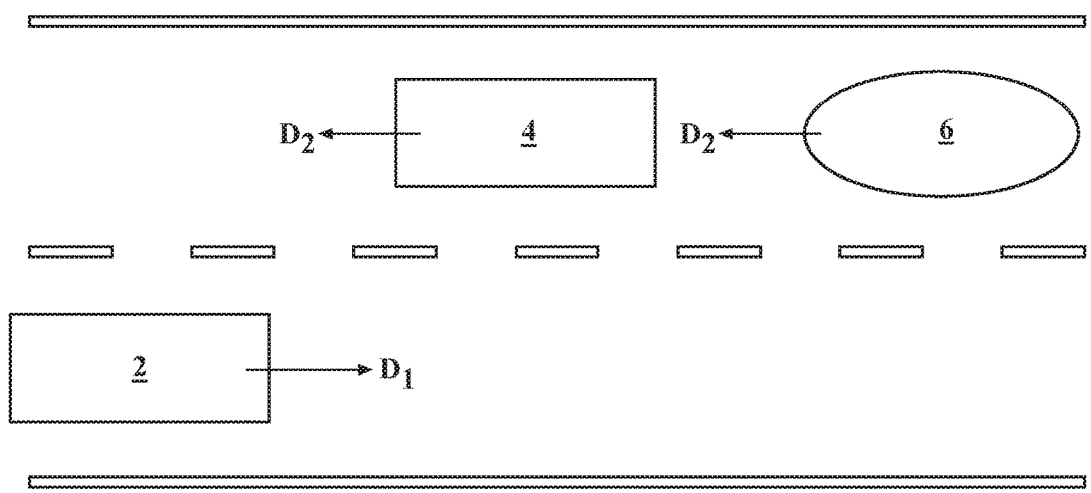
FIG. 1 is a schematic drawing of three motor vehicles on a roadway.

This disclosure is directed to implementations of methods and apparatuses that can be used to selectively acknowledge drivers of other motor vehicles, including, but not limited to automobiles, trucks, motorcycles, boats, etc. As a non-limiting example illustrated in FIG. 1, a first motor vehicle 2 is headed in a first direction $D_1$, and a second motor vehicle 4 and a third motor vehicle 6 are headed in a second direction $D_2$ that is opposite the first direction $D_1$. The first motor vehicle 2 and the second motor vehicle 4 are illustrated as squares to represent that the first motor vehicle 2 and the second motor vehicle 4 were manufactured by the same manufacturer or are marketed under the same brands. The third motor vehicle 6 is illustrated as an oval to represent that the third motor vehicle 6 has a different brand or was manufactured by a manufacturer that is different than the manufacturer of the first motor vehicle 2 and the second motor vehicle 4.

Because the first motor vehicle 2 and the second motor vehicle 4 share a common and desired characteristic, such as, but not limited to, being manufactured by the same manufacturer or marketed under the same brand, drivers of the first motor vehicle 2 and the second motor vehicle 4 may want to acknowledge or signal one another as they pass one another on the roadway. Although the driver of the first motor vehicle 2 will pass the third motor vehicle 6 shortly after passing the driver of the second motor vehicle 4, the driver of the first motor vehicle 2 may intend the acknowledgment for only the driver of the second motor vehicle 4 and not a driver of the third motor vehicle 6. The acknowledgment can be assisted by an apparatus 100 carried by or mounted within a motor vehicle 104, illustrated in FIGS. 2-4, an apparatus 200 included within a side mirror 202 of a motor vehicle 204, illustrated in FIG. 5, or an apparatus 300 attached to a side mirror 302 of a motor vehicle, illustrated in FIGS. 6-8.

Figure 2:
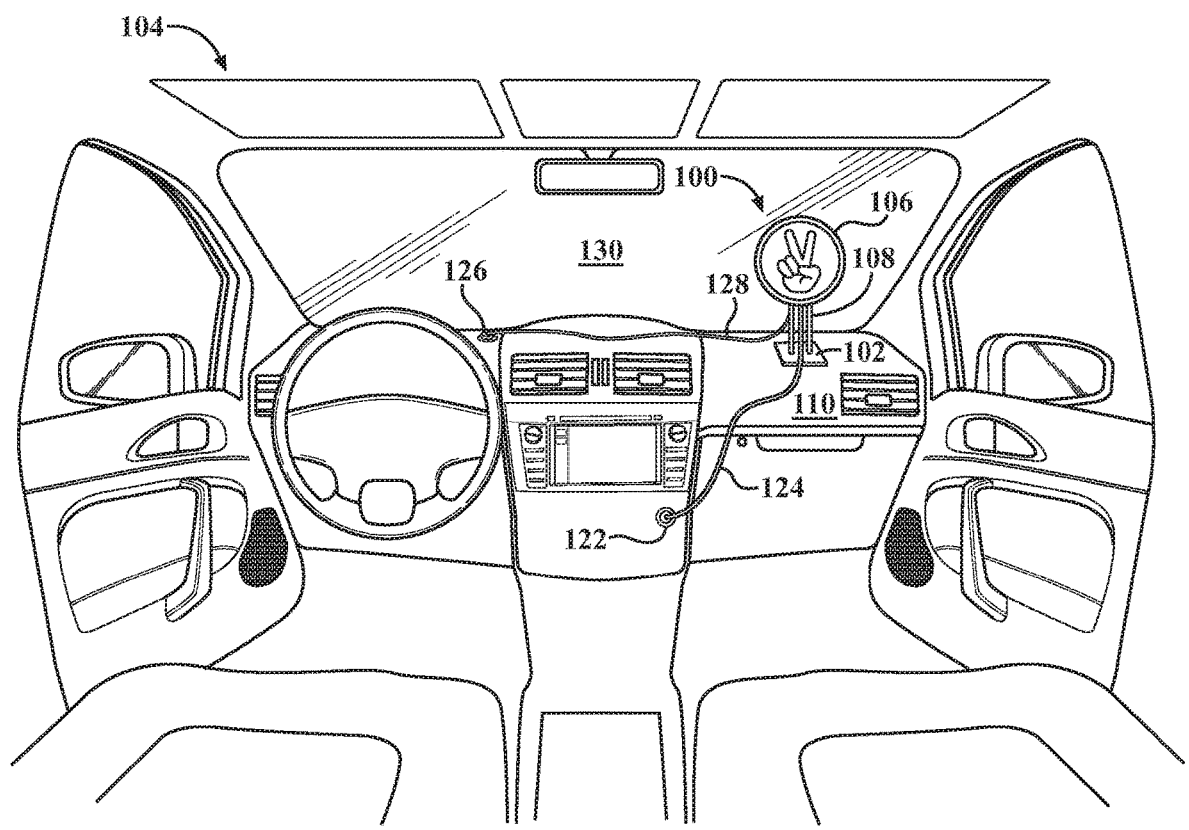
FIG. 2 is a front view of an interior of a motor vehicle with a first embodiment of an apparatus for selectively acknowledging drivers of other motor vehicles mounted within a motor vehicle.
Figure 4:
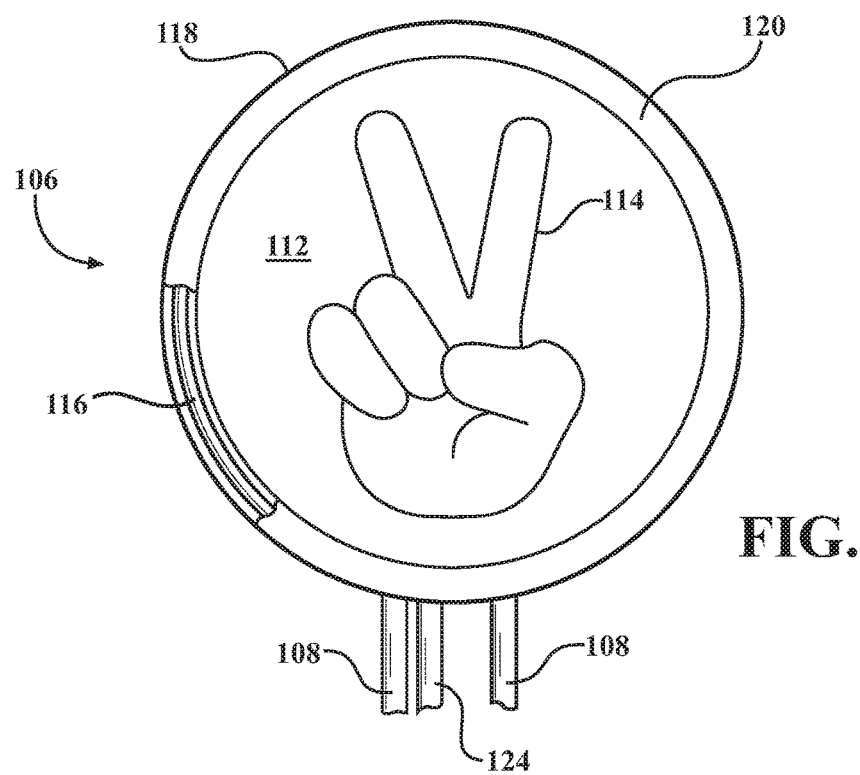
FIG. 4 is a front view of a lamp portion of the apparatus with a cutaway region showing a light source.
Figure 3:
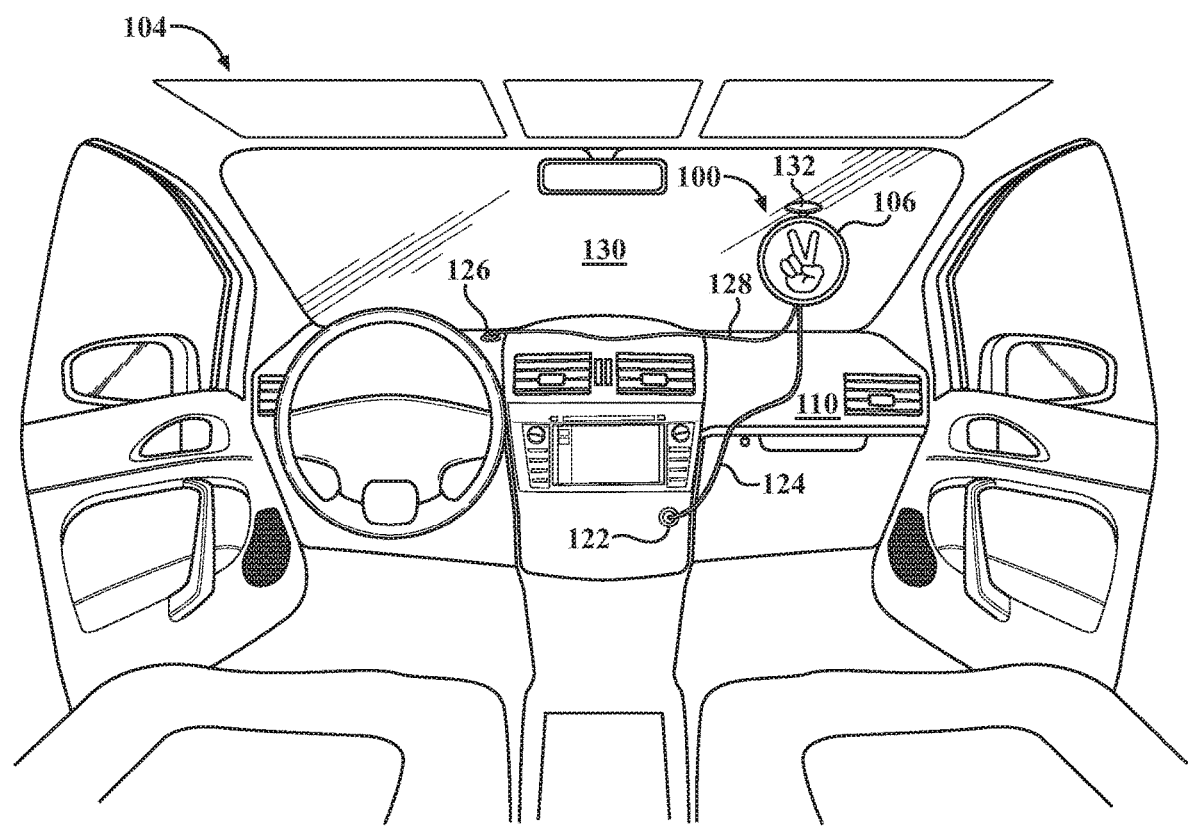
FIG. 3 is a front view of the interior of the motor vehicle with the first embodiment of the apparatus suspended from a windshield of the motor vehicle.

As shown in FIGS. 2-4, the apparatus 100 includes a base portion 102 that can be mounted within the motor vehicle 104 and a lamp portion 106 that can be activated manually by a driver (not shown) of the motor vehicle 104 or automatically activated to selectively acknowledge drivers of other motor vehicles. One or more rigid supports 108 can connect the lamp portion 106 to the base portion 102 of the apparatus 100. In the illustrated, non-limiting example, the base portion 102 has a substantially cuboid configuration with one side of the base portion 102 mounted to a dashboard 110 of the motor vehicle 104 using conventional adhesives or other connecting means, and the rigid supports 108 may be connected to an opposing side of the base portion 102. Other configurations are possible. For example, the base portion 102 could be omitted, and the lamp portion 106 could be hung from a windshield 130 of the motor vehicle 104 using a connecting means, such as a suction cup 132, sticky pads (not shown), or conventional adhesives (not shown), as shown in FIG. 3, with the lamp portion 106 suspended below the base portion 102. Alternatively, the apparatus 100 can be positioned in any other location in the motor vehicle 104 where an oncoming motor vehicle can view the lamp portion 106 of the apparatus 100.

The lamp portion 106, shown in detail in FIG. 4, can include a rigid member 112 with an indicator 114 and a light source 116. The rigid member 112 can be made from a substantially transparent material, such as glass, with the indicator 114 etched on the rigid member 112. As shown, the rigid member 112 has a substantially disc-like configuration; however, other configurations are possible.

The indicator 114 is an acknowledgement that the driver of the motor vehicle 104 can selectively provide to other drivers, which can vary depending on the implementation. For example, the indicator 114 could include only an image (a representation of an external form of a person or design, such as a smiley face), include only text (such as "HI"), or include both an image and text. As shown, the indicator 114 is an outline of a person's hand giving a peace sign by raising the person's middle and index fingers.

To illuminate the indicator 114, the light source 116 can be any type of light source now or hereinafter known, such as a light emitting diode (LED). As illustrated, the light source 116 extends along an outer periphery 118 of the rigid member 112 and is housed within a flexible cover 120 that directs light emitted from the light source 116 toward the indicator 114. As a result, the indicator 114 is illuminated when light is emitted from the light source 116. Alternative configurations of the lamp portion 106 are possible. For example, the indicator 114 could block light with surrounding areas of the rigid member 112 thereby illuminating light to display the indicator 114.

To power the light source 116, the apparatus 100 can be provided with batteries (not shown), hardwired to a power source (not shown) of the motor vehicle 104, or removably connected to an external power source, such as a 12V auxiliary power outlet 122 of the motor vehicle 104. In the illustrated, non-limiting example, the light source 116 is powered using a power adapter 124 connected to the light source 116 and the 12V auxiliary power outlet 122 of the motor vehicle 104. To maintain the position of the power adapter 124, fasteners (not shown), such as hook and loop fasteners, can be used to secure intermediary portion(s) to one of the rigid supports 108.

To allow the driver of the motor vehicle 104 to selectively power the light source 116 to the indicator 114, a trigger 126 or switch can be mounted on the dashboard 110 of the motor vehicle 104 in a position that can be easily reached by the driver of the motor vehicle 104. A cable 128 can connect the trigger 126 to the power adapter 124 and/or the light source 116 so that power is delivered from the power adapter 124 to the light source 116 when the trigger 126 is activated, and power is not delivered from the power adapter 124 to the light source 116 when the trigger 126 is not activated. The trigger 126 can be set so that the trigger 126 activates when the driver presses the trigger 126 and automatically deactivates when the driver releases the trigger 126. In the alternative, the trigger 126 may activate upon the driver pressing and releasing the trigger 126 and remain activated until manually deactivated by the driver pressing the trigger 126 a second time. The cable 128 can be secured to the dashboard 110 of the motor vehicle 104 using fasteners (not shown), such as hook and loop fasteners. Alternatively, the trigger 126 can be wirelessly connected to the power adapter 124 and/or the light source 116 through the use of conventional technology.

To use the manual activation feature of the apparatus 100, the driver of the motor vehicle 104 activates the trigger 126, which in turn illuminates the indicator 114, after the driver manually identifies another motor vehicle that the driver would like to acknowledge. If the trigger 126 is set so that the trigger 126 automatically deactivates once the driver is no longer pressing the trigger 126, the driver of the motor vehicle 104 holds the trigger 126 for as long as the driver would like the indicator 114 to be illuminated by the light source 116. Alternatively, the driver may press and release the trigger 126 to activate the trigger 126 and press the trigger 126 a second time to deactivate the trigger 126 so that the indicator 114 is no longer illuminated by the light source 116. The apparatus 100 can also be configured to automatically activate the light source 116 by identifying and acknowledging other drivers through a wireless signal, which will be explained later in relation to the apparatus 300.

Figure 5:
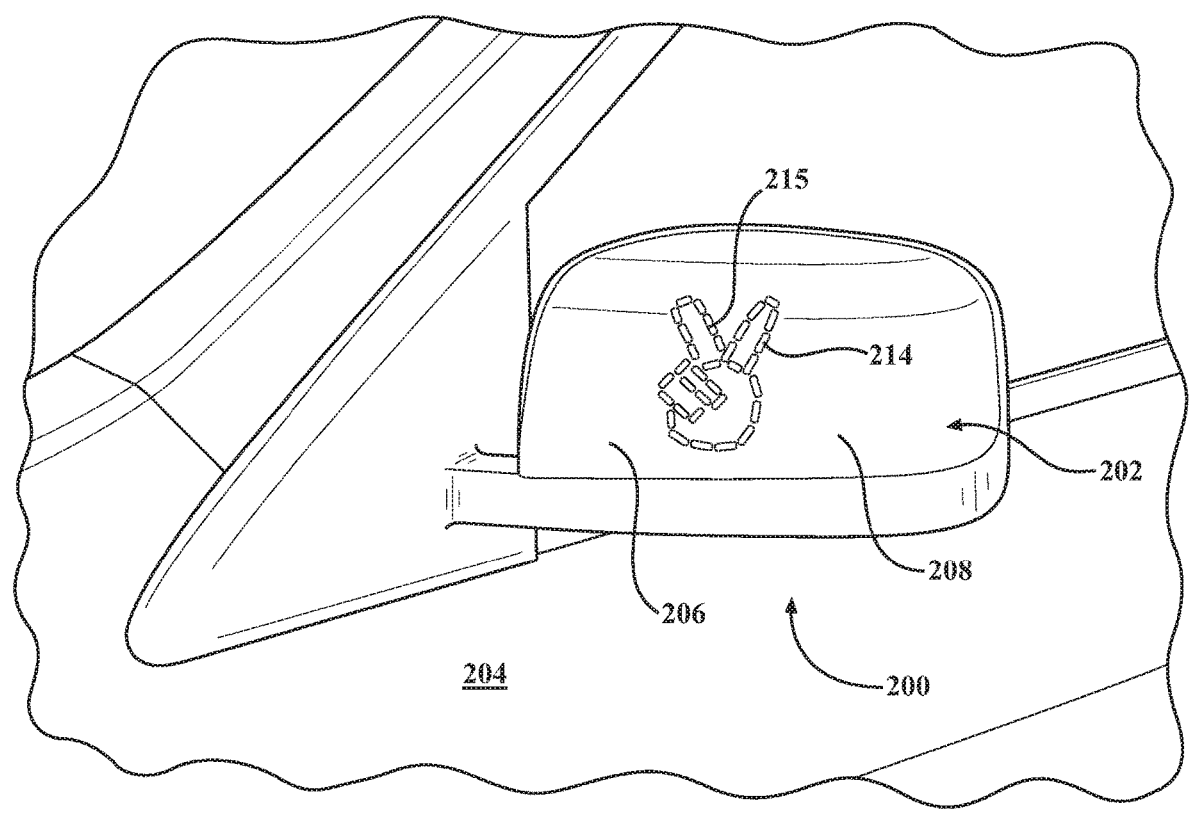
FIG. 5 is a perspective view of a second embodiment of the apparatus within a side mirror of the motor vehicle.

FIG. 5 illustrates a second embodiment of the apparatus 200, which is housed within the side mirror 202 of the motor vehicle 204. The apparatus 200 can be an after-market side mirror 202 added on to the motor vehicle 204 by an owner or can be a factory installed side mirror 202 offered by a manufacturer of the motor vehicle 204. The apparatus 200 is similar to the apparatus 100 except for differences that will be explained later.

The apparatus 200 includes a light source (not shown in FIG. 5) disposed within a hollow housing 206 of the side mirror 202, wherein the hollow housing 206 has a solid front portion 208 and an open back portion with a mirror (not shown) mounted within the opening of the back portion of the hollow housing 206. The light source may be powered by batteries (not shown), hard wired to a power source (not shown) of the motor vehicle 204, or wired to a solar panel, as described later in relation to the apparatus 300. An indicator 214 is formed on the front portion of the hollow housing 206 by having at least one aperture 215 extending through the front portion of the hollow housing 206 so that light from the light source is emitted through the at least one aperture 215 to illuminate the indicator 214. The indicator 214 may be formed by the apertures 215 in the hollow housing 206 forming an image, such as a person's hand forming the peace sign, as previously described. Like the apparatus 100, the indicator 214 can be illuminated by the driver of the motor vehicle 204 selectively activating a trigger (not shown in FIG. 5) and manually activating and/or deactivating the light source or automatically activating and/or deactivating the light source by a wireless signal, as will be explained later in relation to the apparatus 300.

Figure 6:
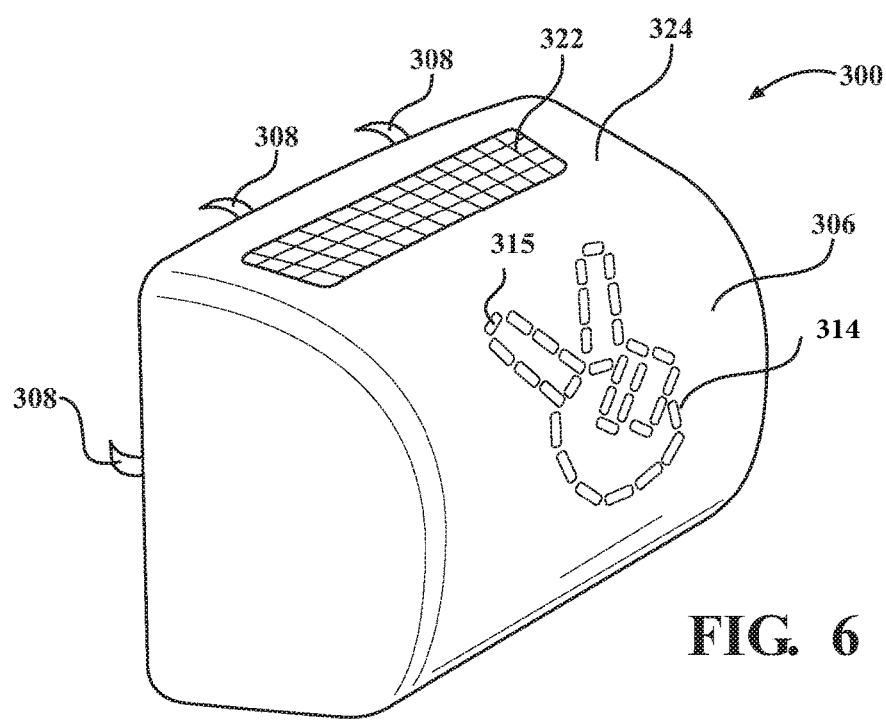
FIG. 6 is a perspective view of a third embodiment of the apparatus attached to the side mirror of the motor vehicle.
Figure 7:
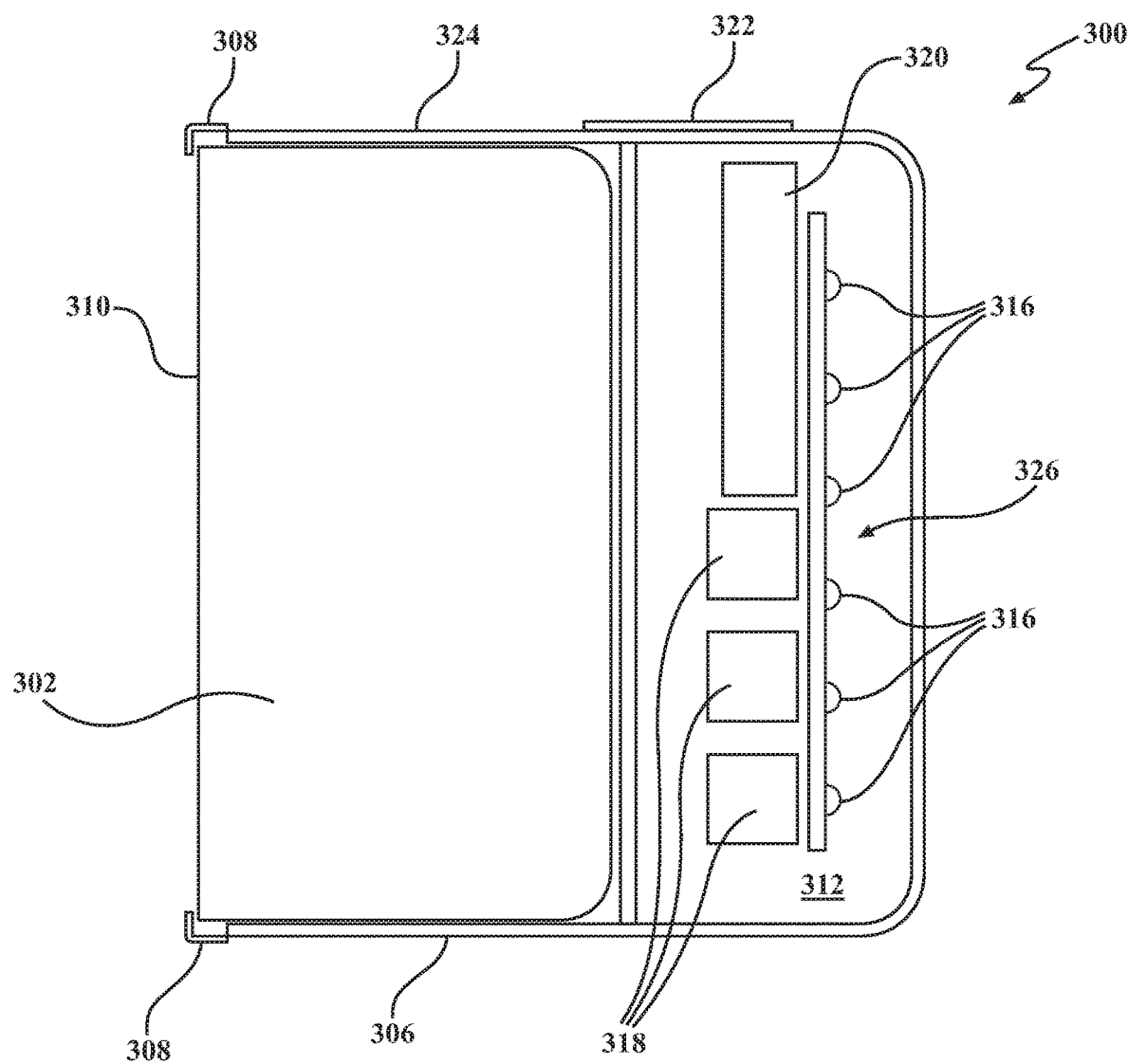
FIG. 7 is a schematic drawing of the third embodiment of the apparatus.

FIGS. 6-7 illustrate a third embodiment of the apparatus 300, which is similar to the apparatus 100 and the apparatus 200 except as will be explained. The apparatus 300 provides a housing cover 306 that is configured to attach onto a front side of the housing 206 of the side mirror 302 of the motor vehicle 204, as previously shown in FIG. 5. As shown, the housing cover 306 may snap onto the side mirror 302 through the use of a plurality of connectors 308 extending integrally from the housing cover 306. The connectors 308 extend partially over a side 310 of the side mirror 302 to hold the apparatus 300 onto the side mirror 302 in a friction or snap fit. Other possible structures or methods could be used to connect the apparatus 300 to the side mirror 302.

Within a compartment 312 of the housing cover 306, a circuit board assembly 326 can be provided that includes a light source 316, relays 318, and a battery 320. In the illustrated non-limiting example, the light source 316 is a LED array, the relays 318 are radio frequency relays or rectifiers, and the battery 320 is a Lithium Polymer (LiPo) battery. However, other light sources, relays, and batteries can be used. For example, the relays 318 could be configured to use other technologies, such as Bluetooth, Zigbee, GPS, or Wi-Fi. A solar cell 322 in communication with the circuit board assembly 326 and the battery 320 can be provided on a top side 324 of the housing cover 306 for recharging the battery 320.

Similar to the indicator 214, an indicator 314 can be defined by at least one aperture 315 extending through a front side 328 of the housing cover 306. The apertures 315 may form the indicator 314, such as a person's hand using two fingers to flash a peace sign as previously described, wherein the indicator 314 is illuminated by light emitted by the light source 316 of the circuit board assembly 326 and shining through the apertures 315 of the indicator 314. The light source 316 can be turned on or activated manually by a trigger (not shown in FIGS. 6-7) within the motor vehicle 204, wherein the trigger is in wireless communication with the relays 318. Alternatively, the light source 316 can be selectively powered or automatically activated whenever the relays 318 are activated by a specific wireless signal, such as Bluetooth or any other wireless signal. Such wireless signals would generally be sent and received by similar apparatuses mounted on other similarly branded motor vehicles such that the indicator 314 would be illuminated by passing motor vehicles. The range of the wireless signal is designed to be limited to a known distance so that only similar apparatuses carried by other motor vehicles in close proximity would be activated and illuminated.

Figure 8:
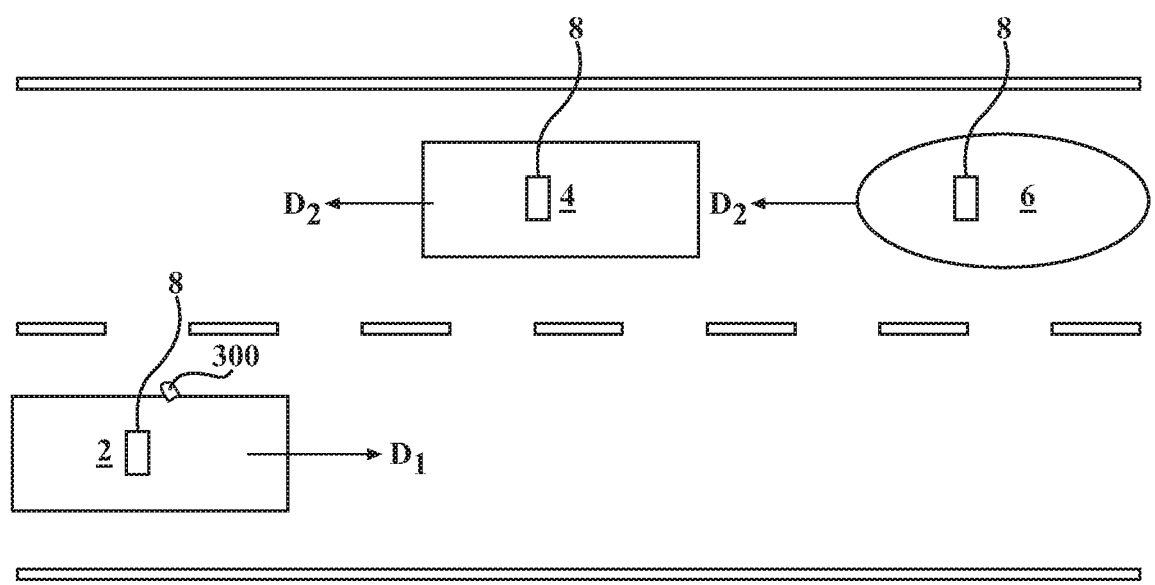
FIG. 8 is a schematic drawing showing the three motor vehicles on the roadway with the third embodiment of the apparatus.

As illustrated in FIG. 8, the apparatus 300 is provided on the first motor vehicle 2, and the first motor vehicle 2, the second motor vehicle 4, and the third motor vehicle 6 contain transmitters 8 that emit signals identifying a characteristic about the respective motor vehicle 2, 4, and 6. For example, the characteristic could be the manufacturer or brand of the motor vehicle 2, 4, and 6. The relays 318 of the apparatus 300 receive the signals transmitted by the transmitters 8 of other apparatuses carried by other motor vehicles. When the relays 318 of the apparatus 300 receive a signal matching the desired characteristic, the relay 318 switches the circuit on so that the light source 316 can be powered by the battery 320 for a period of time. For example, the signal from the transmitter 8 of the second motor vehicle 4 would cause the indicator 314 carried by the first motor vehicle to be illuminated because the first motor vehicle 2 and the second motor vehicle 4 were manufactured by the same manufacturer or have the same brand, while the signal from the transmitter 8 of the third motor vehicle 6 would not cause the indicator 314 on the first motor vehicle to be illuminated because the first motor vehicle 2 and the third motor vehicle 6 were manufactured by different manufacturers or have different brands. Illumination of the indicator 314 ceases after the second motor vehicle 4 has passed the first motor vehicle 2 or is beyond a desired range. This could be based on an estimated time interval of how long it would take for the first motor vehicle 2 to pass the second motor vehicle 4, strength of the signal, or other possible means.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of automatically and selectively acknowledging drivers of other motor vehicles, the method comprising:

detecting a shared and desired characteristic between a first motor vehicle and a nearby second motor vehicle wherein the second motor vehicle sends a signal received by the first motor vehicle indicating that the second motor vehicle shares the desired characteristic with the first motor vehicle; and illuminating an indicator on the first motor vehicle to acknowledge a driver of the nearby second motor vehicle in response to a determination that the nearby second motor vehicle shares the desired characteristic with the first motor vehicle.

2. The method of claim 1, further comprising:
ceasing illumination of the indicator once the nearby second motor vehicle has passed the first motor vehicle.

3. The method of claim 1, wherein the indicator is disposed on a side mirror of the first motor vehicle and is visible to the driver of the nearby second motor vehicle.

4. The method of claim 1, wherein the indicator is disposed within the first motor vehicle and is visible to the driver of the nearby second motor vehicle.

5. The method of claim 1, further comprising:
discontinuing a current illumination state of the indicator in response to a determination that the nearby second motor vehicle does not share the same desired characteristic with the first motor vehicle.

6. The method of claim 1, wherein the shared and desired characteristic is a common motor vehicle brand.

7. The method of claim 1, wherein the indicator comprises a design.

8. The method of claim 7, wherein the design comprises a hand forming a peace sign.

9. An apparatus that allows a driver of a first motor vehicle to selectively acknowledge a driver of a nearby second motor vehicle, comprising:
a light source connectable to a power source and carried by the first motor vehicle, the light source configured to illuminate an indicator to the driver of the nearby second motor vehicle when selectively powered by the power source;
at least one relay in communication with the power source and configured to receive signals from the nearby second motor vehicle, wherein the at least one relay allows power to be delivered to the light source upon receiving a desired wireless signal from the nearby second motor vehicle; and
wherein the desired wireless signal indicates that the first motor vehicle and the second motor vehicle share a common characteristic.

10. The apparatus of claim 9, further comprising:
a housing connected to the first motor vehicle and configured to house the power source, the light source, and the at least one relay.

11. The apparatus of claim 10, wherein the power source comprises a solar panel.

12. The apparatus of claim 10, wherein the indicator comprises apertures extending through a front portion of the housing so that light from the light source is emitted through the apertures to illuminate the indicator.

13. The apparatus of claim 10, wherein the housing is attachable to a side mirror of the first motor vehicle.

14. The apparatus of claim 9, further comprising:
a lamp portion having a substantially disc-like configuration with the light source extending along an outer periphery of the lamp portion, wherein the lamp portion is mountable within the first motor vehicle.

15. The apparatus of claim 9, further comprising:
a trigger configured to allow the driver of the first motor vehicle to override the at least one relay and selectively power the power source.

16. The apparatus of claim 9, wherein the at least one relay is configured to use at least one of a radio frequency, Bluetooth, Zigbee, GPS, or Wi-Fi signal.

17. The apparatus of claim 9, wherein the indicator comprises an outline of a design.

18. The apparatus of claim 9, wherein the at least one relay is configured to stop powering the indicator once the second motor vehicle is out of range of the first motor vehicle.

* * * * *